United States Patent
Lee et al.

(10) Patent No.: US 10,212,571 B2
(45) Date of Patent: Feb. 19, 2019

(54) VEHICLE EMERGENCY NOTIFICATION APPARATUS AND METHOD USING EXTERNAL TERMINAL

(71) Applicant: ELECTRONICS AND TELECOMMUNICATIONS RESEARCH INSTITUTE, Daejeon (KR)

(72) Inventors: Jun-Seob Lee, Daejeon (KR); Tae-Hyoung Shim, Seoul (KR); Jin-Young Lee, Seoul (KR); Jeong-Il Yim, Daejeon (KR); Yong-Yoon Kim, Asan-si (KR); Hyoung-Jun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/440,089

(22) Filed: Feb. 23, 2017

(65) Prior Publication Data
US 2017/0251346 A1    Aug. 31, 2017

(30) Foreign Application Priority Data

Feb. 25, 2016   (KR) .................. 10-2016-0022614
Jan. 31, 2017   (KR) .................. 10-2017-0013745

(51) Int. Cl.
*H04W 4/90*    (2018.01)
*B60R 21/00*   (2006.01)

(52) U.S. Cl.
CPC ....... *H04W 4/90* (2018.02); *B60R 2021/0027* (2013.01)

(58) Field of Classification Search
CPC .. H04M 1/72563; H04M 3/382; H04W 48/02
See application file for complete search history.

(56) References Cited

U.S. PATENT DOCUMENTS

| 7,245,900 B1 * | 7/2007 | Lamb | H04M 3/5116 379/37 |
| 2009/0315719 A1 * | 12/2009 | Song | G08B 21/0446 340/573.1 |

(Continued)

FOREIGN PATENT DOCUMENTS

| KR | 10-2009-0057762 | 6/2009 |
| KR | 10-1183844 | 9/2012 |

(Continued)

*Primary Examiner* — Christopher M Brandt
(74) *Attorney, Agent, or Firm* — Kile Park Reed & Houtteman PLLC

(57) ABSTRACT

Disclosed herein are a vehicle emergency notification method and apparatus using interaction with an external terminal. Some of functions of a conventional vehicle emergency notification apparatus are performed by a replaceable or detachable external terminal. The apparatus may provide notification of a vehicle emergency via interaction with the external terminal. The external terminal generates a Minimum Set of Data (MSD) related to an accident involving the vehicle. A proxy Public Safety Answering Point (PSAP) receives the MSD from the external terminal. The PSAP finally determines whether an accident involving the vehicle has occurred via interaction with a proxy PSAP FE and interaction with a vehicle occupant, and requests dispatch from an emergency agency if it is finally determined that the accident involving the vehicle has occurred.

15 Claims, 9 Drawing Sheets

(56) References Cited

U.S. PATENT DOCUMENTS

| | | | |
|---|---|---|---|
| 2010/0227584 A1 | 9/2010 | Hong | |
| 2011/0153149 A1 | 6/2011 | Jeon et al. | |
| 2012/0208492 A1* | 8/2012 | Tschofenig | H04M 3/5116 455/404.2 |
| 2013/0065550 A1* | 3/2013 | Green | H04W 4/22 455/404.2 |
| 2015/0065142 A1 | 3/2015 | Song | |
| 2015/0111517 A1* | 4/2015 | Kowalewski | H04W 4/22 455/404.1 |
| 2015/0342542 A1* | 12/2015 | An | A61B 5/747 455/404.2 |

FOREIGN PATENT DOCUMENTS

| | | |
|---|---|---|
| KR | 10-2014-0059933 | 5/2014 |
| KR | 10-2015-0144029 | 12/2015 |
| WO | 2009/124131 | 10/2009 |

* cited by examiner

VEHICLE EMERGENCY NOTIFICATION APPARATUS AND METHOD USING EXTERNAL TERMINAL

CROSS REFERENCE TO RELATED APPLICATIONS

This application claims the benefit of Korean Patent Application Nos. 10-2016-0022614, filed Feb. 25, 2016 and 10-2017-0013745, filed Jan. 31, 2017, which are hereby incorporated by reference in their entirety into this application.

BACKGROUND OF THE INVENTION

1. Technical Field

The following embodiments relate generally to a vehicle emergency notification apparatus and method and, more particularly, to a vehicle emergency notification apparatus and method using an external terminal.

2. Description of the Related Art

Current vehicle accident notification systems, for example, an e-Call system, adopt a scheme in which, when an accident occurs, a voice call is connected to a control center, such as a Public Safety Answering Point (PSAP), using a device embedded in a vehicle (e.g. an In-Vehicle System; IVS), and in which a Minimum Set of Data (MSD) related to the accident is transmitted.

Therefore, a problem arises in that vehicles that were released without being equipped with such an IVS, which includes most vehicles, cannot use an e-Call function.

Further, the conventional scheme, which connects a voice call to the PSAP after the IVS has detected an accident, requires the intervention of operating personnel of the PSAP in order to respond to a voice call even for accidents that do not need emergency response support, thus resulting in a large load on the operation of the PSAP.

In relation to e-Call, related technologies are disclosed in Korean Patent No. 10-1183844 and Korean Patent Application Publication No. 10-2014-0059933.

SUMMARY OF THE INVENTION

An embodiment is intended to provide an apparatus and method that provide notification of a vehicle emergency using an external terminal such as a black box or a navigation device which is additionally mounted in a vehicle after the vehicle is purchased.

An embodiment is intended to provide an apparatus and method that provide an e-Call function using an external terminal.

An embodiment is intended to provide an apparatus and method that enable an e-Call function to be provided even to an older model vehicle, to which an e-Call function was not provided by a vehicle manufacturer.

An embodiment is intended to provide an apparatus and method that allow an occupant of a vehicle in which an accident has occurred to cancel the report of occurrence of the accident.

An embodiment is intended to provide an apparatus and method that can investigate the report of occurrence of an accident before the operating personnel of a PSAP intervene in the response to the accident, and can exclude reports of occurrence of accidents that do not require an emergency response.

An embodiment is intended to provide an apparatus and method that can minimize an operating load on a PSAP by canceling reports of occurrence of accidents or by excluding reports of occurrence of accidents.

In accordance with an aspect, there is provided a vehicle emergency notification apparatus, including a proxy Public Safety Answering Point (PSAP) Functional Entity (FE) for receiving a Minimum Set of Data (MSD) related to occurrence of an accident involving a vehicle from an external terminal, and transferring the MSD to a PSAP; and an interface for providing communication between the external terminal and the proxy PSAP FE.

The proxy PSAP FE may determine whether the accident involving the vehicle has occurred by making a call to an occupant of the vehicle before transferring the MSD to the PSAP, and transfer the MSD to the PSAP if it is determined that the accident has occurred.

The proxy PSAP FE may make a voice call to the occupant using an automatic response function, and determine whether the accident has occurred based on a conversation in the made voice call.

The vehicle emergency notification apparatus may further include a voice call FE for providing a function of a voice call that uses the automatic response function between the occupant and the proxy PSAP FE.

The voice call FE may provide a function of a voice call between the occupant and operating personnel of the PSAP.

The proxy PSAP FE may attempt to make a call to the occupant.

If the occupant does not answer the call within a predetermined period of time, the proxy PSAP FE may determine that the accident has occurred.

The proxy PSAP FE may make a call to a mobile terminal of the occupant using call information.

The call information may be information required in order to make a call to the occupant.

The call information may be included either in the MSD or in information that is transmitted together with the MSD to the proxy PSAP FE.

The proxy PSAP FE may connect the call, currently made to the occupant, to the PSAP either after the MSD has been transferred to the PSAP or while the MSD is being transferred thereto.

The proxy PSAP FE may be configured to, when a request to cancel a request for an emergency response is not received from the occupant via the call, transfer the MSD to the PSAP.

The proxy PSAP FE may send an acknowledgement of the MSD to the external terminal.

The proxy PSAP FE may be configured to, when a request to cancel a report of the accident is received from the external terminal, determine that the accident has not occurred.

The request to cancel the report of the accident may be input by the occupant via a user interface of the external terminal.

The external terminal may request the occupant to confirm occurrence of the accident involving the vehicle via the user interface.

The external terminal may assume that the accident involving the vehicle has occurred if time-out occurs without confirmation of the occupant within a predetermined period of time.

The MSD may be transmitted to the proxy PSAP FE immediately after being generated as the external terminal detects the accident.

The external terminal may be a detachable or replaceable device that is not built in the vehicle.

The external terminal may be any one of a black box, a navigation device, and a phone.

The external terminal may communicate with the proxy PSAP FE via a radiotelephone that supports voice communication.

In accordance with another aspect, there is provided a vehicle emergency notification method using an external terminal, including receiving a Minimum Set of Data (MSD) related to occurrence of an accident involving a vehicle from the external terminal; and transferring the MSD to a Public Safety Answering Point (PSAP).

In accordance with a further aspect, there is provided a method for processing notification of a vehicle accident, the method being performed by a Public Safety Answering Point (PSAP), including receiving a Minimum Set of Data (MSD) related to occurrence of an accident involving a vehicle from a proxy PSAP FE of the vehicle; exchanging information about the accident by making a call to an occupant of the vehicle; determining whether the accident involving the vehicle has occurred based on the exchanged information; and transmitting a request for dispatch to the vehicle to an emergency agency if it is determined that the accident involving the vehicle has occurred.

The proxy PSAP FE may connect the call, currently made to the occupant, to the PSAP.

The PSAP may be configured to, if it is determined that the accident involving the vehicle has not occurred, cancel a report of occurrence of the accident or a request for an emergency response, which has been made via transmission of the MSD.

Moreover, other methods, apparatus, and systems for implementing the present disclosure, and a computer-readable storage medium for storing a computer program for executing the method, may be further provided.

DESCRIPTION OF THE PREFERRED EMBODIMENTS

Figure 1:
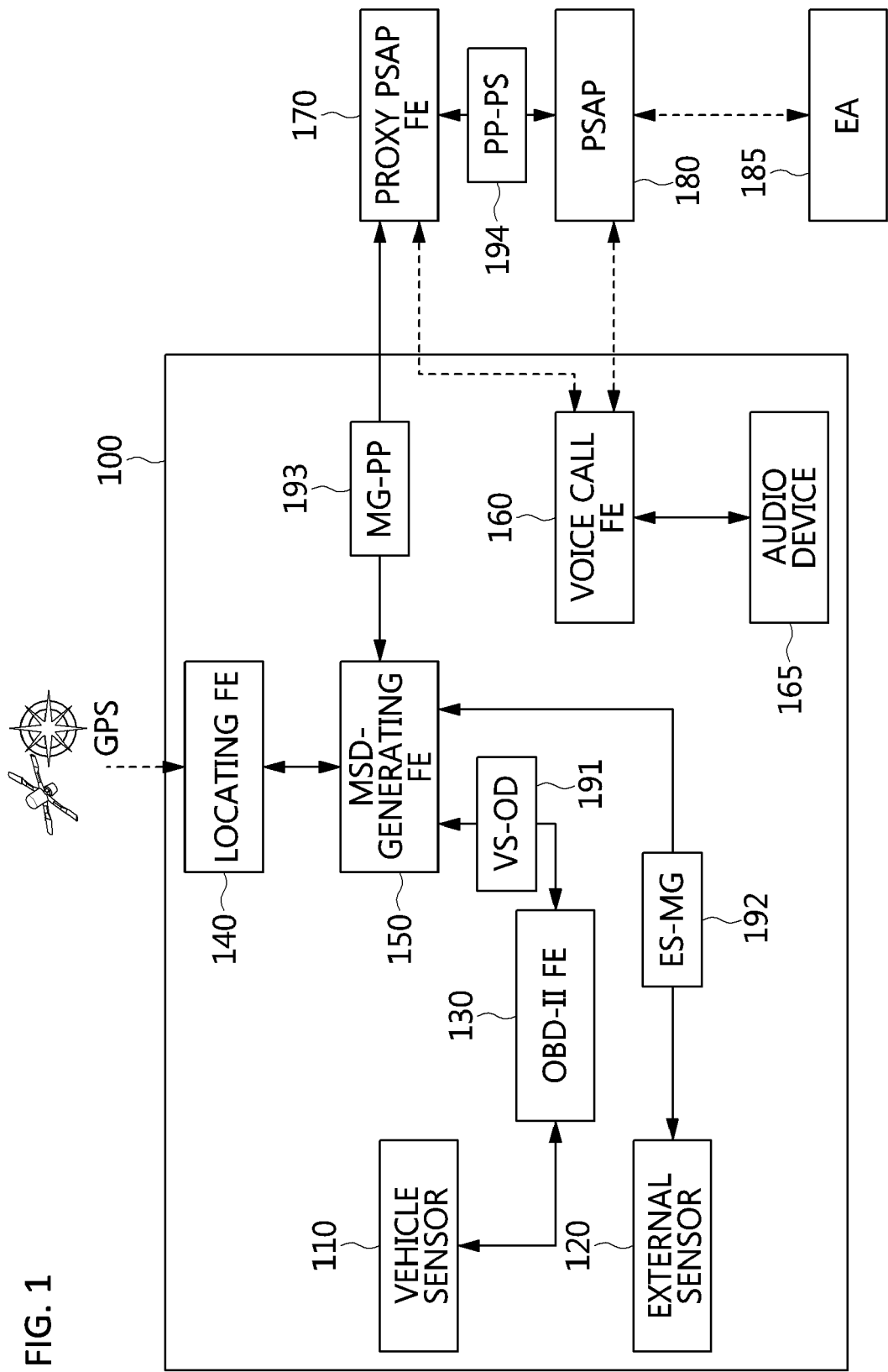
FIG. 1 is a configuration diagram illustrating a vehicle emergency notification apparatus and entities operating in conjunction with the apparatus according to an embodiment.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

The terms used in the present specification are merely used to describe specific embodiments and are not intended to limit the present disclosure. In the embodiments, a singular expression includes a plural expression unless a description to the contrary is specifically pointed out in context. In the present specification, it should be understood that terms such as "comprises" and/or "comprising" are merely intended to indicate that components, steps, operations, and/or elements are present, and are not intended to exclude the possibility that one or more other components, steps, operations, and/or elements will be present or added. Such added configurations may be included in the scope of the practice of exemplary embodiments or the scope of the technical spirit of the exemplary embodiments. It will be understood that when a component is referred to as being "connected" or "coupled" to another component, it can be directly connected or coupled to the other component, or intervening components may be present between the two components.

Terms such as "first" and "second" may be used to describe various components, but the components are not restricted by the terms. The terms are used only to distinguish one component from another component. For example, a first component may be named a second component without departing from the scope of the present disclosure. Likewise, a second component may be named a first component.

Also, components described in the embodiments of the present disclosure are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present disclosure as long as it does not depart from the essence of the present disclosure.

Further, some components are not essential components for performing essential functions, but may be optional components for improving only performance. The embodiments may be implemented using only essential components for implementing the essence of the embodiments. For example, a structure including only essential components, excluding optional components used only to improve performance, is included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted.

FIG. 1 is a configuration diagram illustrating a vehicle emergency notification apparatus and entities operating in conjunction with the apparatus according to an embodiment.

A vehicle emergency notification apparatus 100 may include at least some of a vehicle sensor 110, an external sensor 120, an On-Board Diagnostic system-II (OBD-II) Functional Entity (FE) 130, a locating FE 140, a Minimum Set of Data (MSD) generating FE 150, a voice call FE 160, and an audio device 165.

The vehicle emergency notification apparatus 100 may further include a proxy Public Safety Answering Point (PSAP) Functional Entity (FE) 170. Alternatively, the proxy PSAP FE 170 may be regarded as a part of a PSAP 180.

The vehicle emergency notification apparatus 100 may be operated in conjunction with at least some of the proxy PSAP FE 170, the PSAP 180, and an Emergency Agency (EA) 185.

Further, for interfacing between the components of the vehicle emergency notification apparatus 100, at least some of a Vehicle Sensor-Object Descriptor (VS-OD) interface 191, an External Sensor-MSD Generating (ES-MG) interface 192, an MSD Generating-Proxy PSAP (MG-PP) interface 193, and a Proxy PSAP-PSAP (PP-PS) interface 194 may be used.

The vehicle sensor 110 may be a sensor mounted in the vehicle. The vehicle sensor 110 may provide information required by an e-Call terminal to determine whether an accident involving the vehicle has occurred.

For example, the vehicle sensor 110 may include a collision sensor, an airbag deployment sensor, a speed sensor, etc.

The external sensor 120 may be a detachable sensor or a sensor additionally attached to the vehicle, in addition to the vehicle sensor 110 mounted on the vehicle. The external sensor 120 may provide information required by the e-Call terminal to determine whether an accident involving the vehicle has occurred.

For example, the external sensor 120 may include an acceleration sensor mounted on an aftermarket (AM) e-Call terminal.

The OBD-II FE 130 may perform the function of the AM e-Call terminal. The OBD-II FE 130 may acquire information, required in order to determine whether an accident involving the vehicle has occurred, from the vehicle sensor 110.

The locating FE 140 may acquire location information indicating the location of the vehicle from a satellite. The location information may be Global Positioning System (GPS) information.

The MSD-generating FE 150 may determine, based on the information acquired from the vehicle sensor 110 or the external sensor 120, whether an accident involving the vehicle has occurred. If it is determined that an accident involving the vehicle has occurred, the MSD-generating FE 150 may generate a Minimum Set of Data (MSD) related to the occurrence of an accident involving the vehicle. The MSD may be information related to the occurrence of the accident.

The voice call FE 160 may provide a voice call to the occupant of the vehicle. The voice call FE 160 may provide the function of a voice call that uses an automatic response function, such as an Automatic Response System (ARS) between the vehicle occupant and the proxy PSAP FE 170. Further, the voice call FE 160 may provide the function of a voice call between the vehicle occupant and the operating personnel of the PSAP.

The audio device 165 may provide an audio function required for a voice call.

At least some of the external sensor 120, the OBD-II FE 130, the locating FE 140, the MSD-generating FE 150, the voice call FE 160, and the audio device 165 may be external terminals.

The external terminal may be a detachable or replaceable device that is not built in the vehicle. Further, the external terminal may be an independent device that provides a predetermined function without connecting to the vehicle.

The external terminal may perform the functions of an e-Call terminal and may provide at least some of the functions of the e-Call terminal. In other words, the external terminal may provide the functions of an e-Call terminal mounted in a conventional vehicle, and the vehicle emergency notification apparatus 100 may provide the functions of the e-Call terminal while operating in conjunction with the external terminal.

The external terminal may correspond to an external terminal 510 and an M2M modem 520, which will be described later with reference to FIG. 5. Alternatively, the external terminal may correspond to an external terminal 610, an M2M modem 620, and a phone 630, which will be described later with reference to FIG. 6. Alternatively, the external terminal may correspond to an external terminal 710 and a phone 720, which will be described later with reference to FIG. 7. Alternatively, the external terminal may correspond to an OBD-II scanner 810 and a phone 820, which will be described later with reference to FIG. 8. Alternatively, the external terminal may correspond to a phone 910, which will be described later with reference to FIG. 9.

The proxy PSAP FE 170 may receive an MSD from the external terminal. The proxy PSAP FE 170 may make a voice call to the vehicle occupant using an automatic response function, such as an ARS, and may determine whether an accident involving the vehicle has occurred based on a conversation in the made voice call. If it is determined that an accident involving the vehicle and requiring a response thereto has occurred, the proxy PSAP FE 170 may transfer the received MSD to the PSAP 180, and may connect the voice call that is currently made to the PSAP 180.

The PSAP 180 may proceed to finally determine whether an accident involving the vehicle has occurred via the voice call to the occupant. If it is finally determined that an accident involving the vehicle has occurred, the PSAP 180 may request the Emergency Agency (EA) 185 to dispatch a rescue party to the vehicle.

The VS-OD interface 191 may be an interface for converting the information collected from the vehicle sensor 110 into a standardized format and transferring the information converted into the standardized format to the MSD-generating FE 150.

The ES-MG interface 192 may be an interface for converting the information collected from the external sensor 120 in a standardized format and transferring the information converted into the standardized format to the MSD-generating FE 150.

The MG-PP interface 193 may be an interface for transferring the generated MSD to the proxy PSAP FE 170. In other words, the MG-PP interface 193 may be an interface for providing communication between the external terminal and the proxy PSAP FE 170.

The PP-PS interface 194 may be an interface for transferring the MSD, received by the proxy PSAP FE 170, to the PSAP FE 180.

Figure 2:
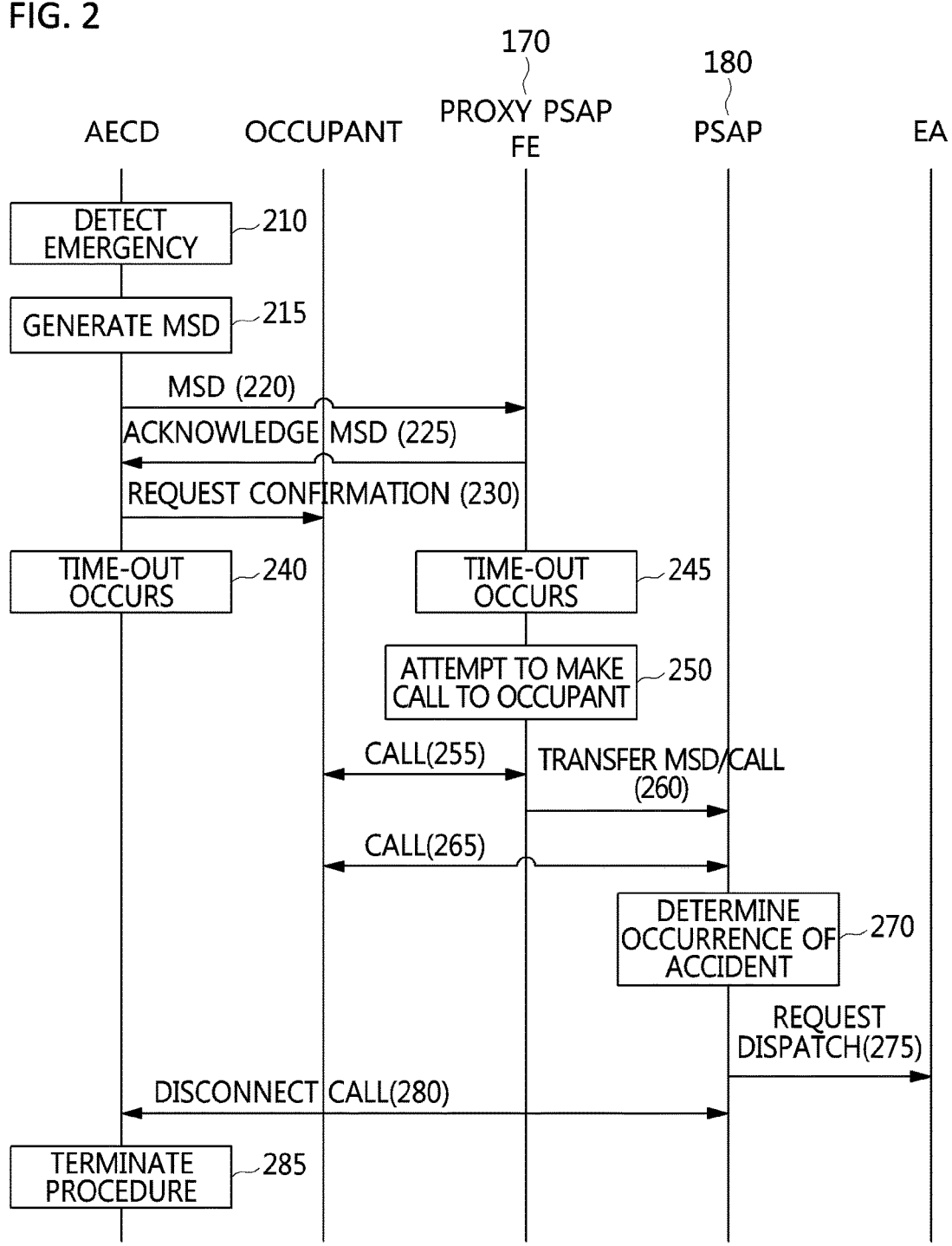
FIG. 2 is a flow diagram illustrating a vehicle emergency notification process according to an embodiment.

FIG. 2 is a flow diagram illustrating a vehicle emergency notification process according to an embodiment.

The following embodiment may be understood to be a method for providing notification of a vehicle emergency from the standpoint of the vehicle and the proxy PSAP FE 170. Further, the following embodiment may be understood to be a method for processing the notification of a vehicle accident from the standpoint of the PSAP 180.

An Automatic Emergency Call Device (AECD) may be the external terminal described above with reference to FIG. 1. For example, the AECD may include at least some of the external sensor 120, the OBD-II FE 130, the locating FE 140, the MSD-generating FE 150, the VS-OD interface 191, and the ES-MG interface 192.

At step 210, the AECD may detect an emergency. The AECD may detect a signal from a sensor indicating a vehicle emergency. Here, the sensor may be the vehicle sensor 110 and/or the external sensor 120. The AECD may receive a sensor signal indicating an emergency from the vehicle sensor 110 and/or the external sensor 120.

At step 215, the AECD may generate an MSD corresponding to the detected emergency. The MSD may indicate the detected emergency. The AECD may generate an MSD indicating an emergency or an accident involving the vehicle in response to a sensor signal indicating a vehicle emergency.

The MSD may include information for allowing the proxy PSAP FE 170 to make a call to the vehicle occupant, for example, the mobile phone number of the vehicle occupant.

At step 220, the AECD may transmit the MSD to the proxy PSAP FE 170. The AECD may notify the proxy PSAP FE 170 of the occurrence of an accident involving the vehicle through the MSD. The proxy PSAP FE 170 may receive the MSD from the AECD.

The MSD may be generated immediately when the AECD detects the accident involving the vehicle, and may be transmitted to the proxy PSAP FE 170 immediately after being generated. In other words, once the MSD is generated, the AECD may immediately transmit the generated MSD to the proxy PSAP FE 170 without performing any operation that delays the transmission of the MSD, such as an operation of requesting the vehicle occupant to confirm the accident. Alternatively, once the MSD is generated, the AECD may immediately transmit the generated MSD to the proxy PSAP FE 170 without standing by for a predetermined operation or interaction.

As the MSD is transmitted to the proxy PSAP FE 170 immediately after being generated, the MSD may be stably provided even when the AECD stops or malfunctions due to the accident. For example, even if a fire occurs in the vehicle or the vehicle is flooded due to an accident, or even if the supply of power to the AECD is interrupted due to an accident, the MSD may be primarily transmitted to the proxy PSAP FE 170. By way of this transmission, the number of cases where vehicle accidents are not reported in spite of the actual occurrence of the vehicle accidents may be minimized.

At step 225, the proxy PSAP FE 170 may send an acknowledgement (Ack) of the MSD to the AECD.

At step 230, the AECD may inform the vehicle occupant that the notification of the occurrence of the accident involving the vehicle has been provided via a user interface, and may request the occupant to confirm the occurrence of the vehicle accident via the user interface.

When the occupant does not confirm the occurrence of the vehicle accident within a predetermined period of time, the user interface may process the current situation as the occurrence of an accident, and may output a message indicating that notification of the accident will be provided.

When the occupant provides the AECD with confirmation that an accident involving the vehicle has not occurred, the AECD and the proxy PSAP FE 170 may recognize that no accident involving the vehicle has occurred. The case where the occupant provides confirmation that an accident involving the vehicle has not occurred will be described in detail later with reference to FIG. 3.

When the occupant provides the AECD with confirmation that an accident involving the vehicle has occurred, the AECD and the proxy PSAP FE 170 may recognize that the accident involving the vehicle has occurred, and step 250 may be performed.

The occupant may not confirm the occurrence of an accident until a predetermined period of time has passed because he or she is unconscious due to the accident or desires notification of the accident to be automatically processed.

At step 240, when time-out occurs without the occupant's confirmation within a predetermined period of time, the AECD may assume that an accident involving the vehicle has occurred.

At step 245, when time-out occurs without the user's confirmation within a predetermined period of time, the proxy PSAP FE 170 may assume that an accident involving the vehicle has occurred.

When the AECD or the proxy PSAP FE 170 assumes that the accident involving the vehicle has occurred, step 250 may be performed.

At step 250, the proxy PSAP FE 170 may attempt to make a call to the occupant using an automatic response function such as an ARS. In other words, the proxy PSAP FE 170 may perform primary determination of whether an accident has occurred, and may then open a separate voice channel. By means of this primary determination and the voice channel, the intervention of the operating personnel of the PSAP 180 may be minimized.

The proxy PSAP FE 170 may make a call to the mobile terminal of the occupant using call information so as to connect a call to the occupant. The call information may be information required to make a call to the occupant. For example, the call information may be the phone number of the mobile terminal of the occupant. The call information may be included either in the MSD or in information that is transmitted together with the MSD from the AECD to the proxy PSAP FE 170 at step 220.

When the occupant does not answer the call within a predetermined period of time, the proxy PSAP FE 170 may determine that an accident involving the vehicle has occurred. In this case, the following step 255 may be omitted, and step 260 may be performed.

At step 255, a call may be made between the proxy PSAP FE 170 and the occupant. The proxy PSAP FE 170 may make a voice call to the occupant using an automatic response function such as an ARS. The proxy PSAP FE 170 may determine whether the accident indicated by the MSD has occurred based on the conversation in the made voice call. For example, the proxy PSAP FE 170 may determine whether the accident indicated by the MSD has occurred based on the occupant's responses to questions output via ARS.

After the call to the occupant has been made and the occupant requests an emergency response via the call, the proxy PSAP FE 170 may determine that the accident involving the vehicle has occurred.

As described above, the proxy PSAP FE 170 may determine whether an accident involving the vehicle has occurred by making a call to the vehicle occupant before transferring the MSD to the PSAP 180. If it is determined that the accident involving the vehicle has occurred, step 260 may be performed.

Meanwhile, the occupant may cancel a request for an emergency response via a call. The case where the occupant cancels a request for an emergency response via a call will be described later with reference to FIG. 4.

At step 260, if it is determined that the accident involving the vehicle has occurred, the proxy PSAP FE 170 may transfer the MSD to the PSAP 180. Further, either after the MSD has been transferred to the PSAP 180 or while the MSD is being transferred thereto, the proxy PSAP FE 170 may connect the call, currently made to the occupant, to the PSAP 180. Through this connection, the call between the occupant and the operating personnel of the PSAP 180 may be established.

Here, the transfer of the MSD may be regarded as the report of the occurrence of the accident involving the vehicle. Further, the report of the occurrence of the accident may be regarded as a request for an emergency response. In other words, the proxy PSAP FE 170 may transmit the report of the accident that occurred and involves the vehicle to the PSAP 180 by transferring the MSD to the PSAP 180, and may send the request for an emergency response to the accident to the PSAP 180.

At step 265, the PSAP 180 may continuously exchange information related to the occurrence of the accident involving the vehicle with the occupant via a call to the occupant. The exchange of the information may be performed by the operating personnel of the PSAP 180.

The voice call FE 160 may provide the function of a voice call between the vehicle occupant and the operating personnel of the PSAP.

At step 270, the PSAP 180 or the operating personnel of the PSAP 180 may finally determine whether the accident involving the vehicle has occurred based on the MSD and the exchanged information.

At step 275, if it is finally determined that an accident involving the vehicle has occurred, the PSAP 180 or the operating personnel of the PSAP 180 may send a request for dispatch to the vehicle to the EA. The dispatch request may include location information about the location of the vehicle. For example, the location information may be information indicative of the location of the vehicle. The location information may be included either in the MSD or in information that is transmitted together with the MSD from the AECD to the proxy PSAP FE 170 at step 220.

If it is finally determined that no accident involving the vehicle has occurred, the PSAP 180 may terminate processing related to the accident. For example, if it is determined that no accident involving the vehicle has occurred, the PSAP 180 may cancel the report of occurrence of the accident or the request for an emergency response, which has been made by transmitting the MSD. In other words, by way of the determination, the PSAP 180 may also cancel the report of occurrence of the accident or the request for an emergency response, which has been made by transmitting the MSD.

At step 280, the PSAP may disconnect the call to the AECD.

At step 285, the AECD may terminate the above procedure.

Figure 3:
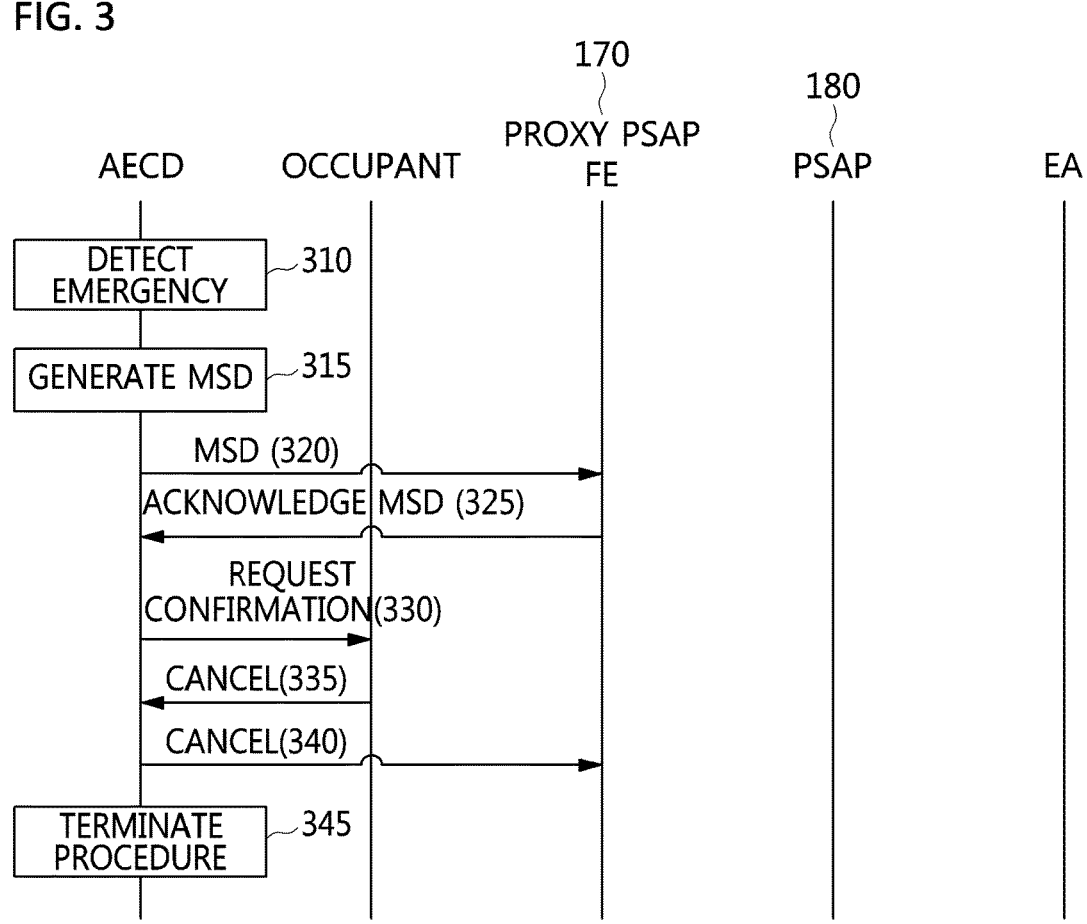
FIG. 3 illustrates an example of the case where a request for an emergency response from a vehicle is canceled via a user interface.

FIG. 3 illustrates an example of the case where a request for an emergency response from a vehicle is canceled via a user interface.

The Automatic Emergency Call Device (AECD) may be the external terminal described above with reference to FIG. 1. For example, the AECD may include at least some of the external sensor 120, the OBD-II FE 130, the locating FE 140, the MSD-generating FE 150, the VS-OD interface 191, and the ES-MG interface 192.

At step 310, the AECD may detect an emergency. The AECD may detect a signal from a sensor indicating a vehicle emergency. Here, the sensor may be the vehicle sensor 110 and/or the external sensor 120. The AECD may receive a sensor signal indicating an emergency from the vehicle sensor 110 and/or the external sensor 120.

At step 315, the AECD may generate an MSD corresponding to the detected emergency. The MSD may indicate the detected emergency. The AECD may generate an MSD indicating an emergency or an accident involving the vehicle in response to a sensor signal indicating a vehicle emergency.

The MSD may include information for allowing the proxy PSAP FE 170 to make a call to the vehicle occupant, for example, the mobile phone number of the vehicle occupant.

At step 320, the AECD may transmit the MSD to the proxy PSAP FE 170.

The AECD may notify the proxy PSAP FE 170 of the occurrence of an accident involving the vehicle through the MSD.

At step 325, the proxy PSAP FE 170 may send an acknowledgement (Ack) of the MSD to the AECD.

At step 330, the AECD may inform the vehicle occupant that the notification of the occurrence of the vehicle accident has been provided via a user interface, and may request the occupant to confirm the occurrence of the vehicle accident via the user interface.

At step 335, the occupant may send a request to cancel the report of the accident to the AECD. The AECD may receive the request to cancel the report of the accident from the occupant.

For example, when the accident involving the vehicle is a minor accident that does not require an emergency response, the occupant may input the request to cancel the report of the accident via the user interface of the AECD.

At step 340, the AECD may transmit the request to cancel the report of the accident to the proxy PSAP FE 170.

The proxy PSAP FE 170 may determine that the accident has not occurred if the request to cancel the report of the accident is received from the AECD.

By way of this determination, the proxy PSAP FE 170 may investigate the report of accident occurrence before the operating personnel of the PSAP 180 intervenes in the response to the accident, and may exclude accidents that do not require an emergency response. Through this investigation and exclusion, the intervention of the operating personnel of the PSAP 180 may be minimized. Furthermore, through this investigation and exclusion, the dispatch of a rescue party for accidents that do not require an emergency response may be minimized.

At step 345, the AECD may terminate the procedure.

Figure 4:
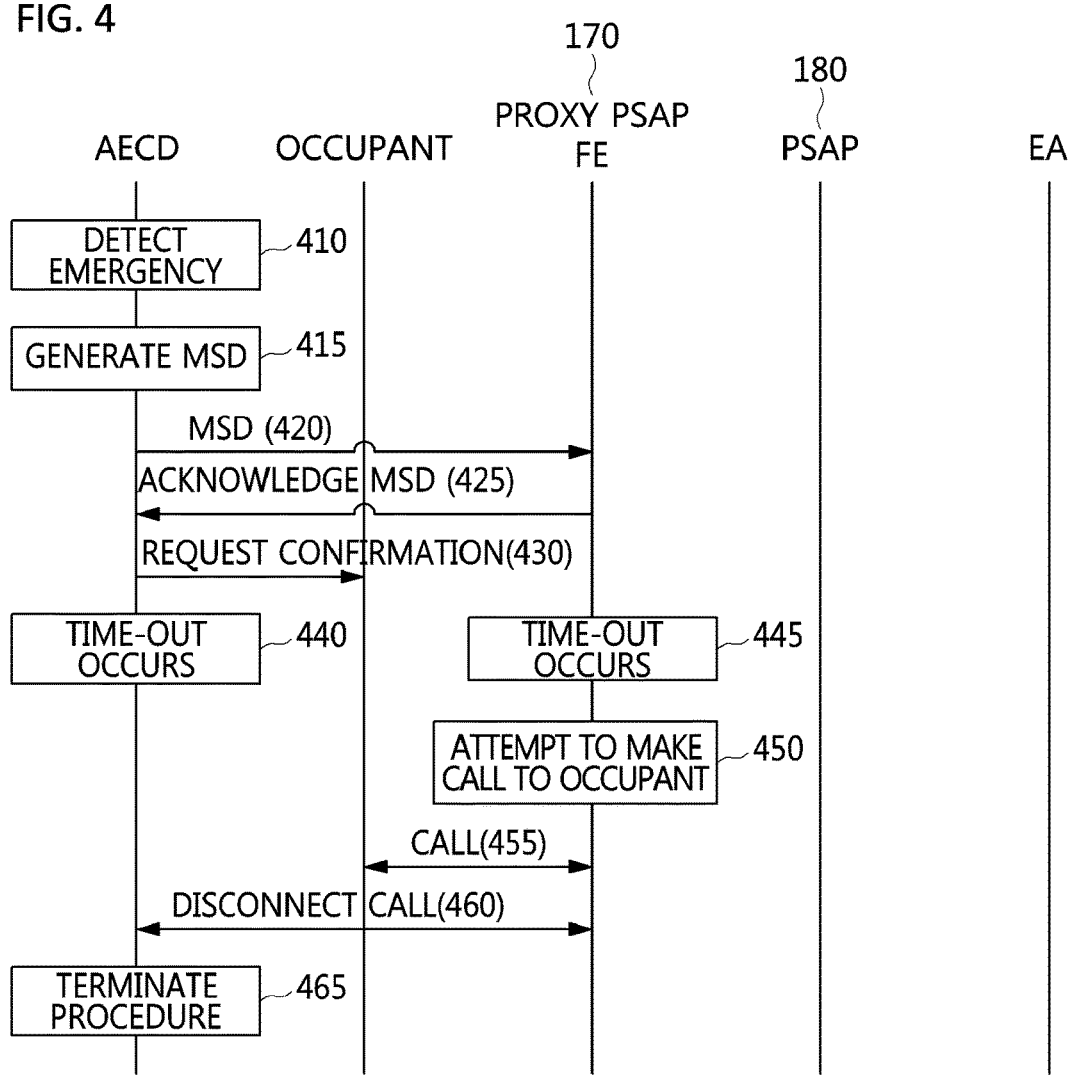
FIG. 4 illustrates an example of the case where a request for an emergency response from a vehicle is canceled via a call between a vehicle occupant and a proxy PSAP.

FIG. 4 illustrates an example of the case where a request for an emergency response from a vehicle is canceled via a call between a vehicle occupant and a proxy PSAP.

The Automatic Emergency Call Device (AECD) may be an external terminal described above with reference to FIG. 1. For example, the AECD may include at least some of the external sensor 120, the OBD-II FE 130, the locating FE 140, the MSD-generating FE 150, the VS-OD interface 191, and the ES-MG interface 192.

At step 410, the AECD may detect an emergency. The AECD may detect a signal from a sensor indicating a vehicle emergency. Here, the sensor may be the vehicle sensor 110 and/or the external sensor 120. The AECD may receive a sensor signal indicating an emergency from the vehicle sensor 110 and/or the external sensor 120.

At step 415, the AECD may generate an MSD corresponding to the detected emergency. The MSD may indicate the detected emergency. The AECD may generate an MSD indicating an emergency or an accident involving the vehicle in response to a sensor signal indicating a vehicle emergency.

The MSD may include information for allowing the proxy PSAP FE 170 to make a call to the vehicle occupant, for example, the mobile phone number of the vehicle occupant.

At step 420, the AECD may transmit the MSD to the proxy PSAP FE 170.

The AECD may notify the proxy PSAP FE 170 of the occurrence of an accident involving the vehicle through the MSD.

At step 425, the proxy PSAP FE 170 may send an acknowledgement (Ack) of the MSD to the AECD.

At step 430, the AECD may inform the vehicle occupant that the notification of the occurrence of the vehicle accident has been provided via a user interface, and may request the occupant to confirm the occurrence of the vehicle accident via the user interface.

Unless the occupant confirms the occurrence of the accident within a predetermined period of time, the user interface may process the current situation as the occurrence of an accident and may output a message indicating that notification of the accident will be provided.

When the occupant provides the AECD with confirmation that an accident involving the vehicle has occurred, the AECD and the proxy PSAP FE 170 may recognize that the accident involving the vehicle has occurred, and step 450 may be performed.

The occupant may not confirm the occurrence of an accident before a predetermined period of time has passed because he or she is unconscious due to the accident or desires notification of the accident to be automatically processed.

At step 440, when time-out occurs without the occupant's confirmation within a predetermined period of time, the AECD may assume that an accident involving the vehicle has occurred.

At step 445, when time-out occurs without the user's confirmation within a predetermined period of time, the proxy PSAP FE 170 may assume that an accident involving the vehicle has occurred.

When the AECD or the proxy PSAP FE 170 assumes that an accident involving the vehicle has occurred, step 450 may be performed At step 450, the proxy PSAP FE 170 may attempt to make a call to the occupant using an automatic response function such as an ARS. The proxy PSAP FE 170 may make a call to the mobile terminal of the occupant using call information so as to connect a call. The call information may be information required to make a call to the occupant. For example, the call information may be the phone number of the mobile terminal of the occupant. The call information may be included either in the MSD or in information that is transmitted together with the MSD from the AECD to the proxy PSAP FE 170 at step 420.

At step 455, a call may be made between the proxy PSAP FE 170 and the occupant.

The occupant may send a request to cancel the request for an emergency response to the proxy PSAP FE 170 via a call that uses an automatic response function such as an ARS. The proxy PSAP FE 170 may receive the request to cancel the request for an emergency response from the occupant via the call.

When the proxy PSAP FE 170 receives the request to cancel the request for an emergency response from the occupant via the call, steps 260, 265, 270, 275, 280 and 285, described above with reference to FIG. 2, may not be performed. In other words, when the proxy PSAP FE 170 does not receive a request to cancel the request for an emergency response from the occupant via a call, the proxy PSAP FE 170 may transfer the MSD to the PSAP 180.

The vehicle occupant may cancel the report of occurrence of an accident or the request for an emergency response, so that the proxy PSAP FE 170 may investigate the report of accident occurrence before the operating personnel of the PSAP 180 intervenes in the response to the accident, and may exclude accidents that do not require an emergency response. Through this investigation and exclusion, the intervention of the operating personnel of the PSAP 180 may be minimized. Furthermore, through this investigation and exclusion, the dispatch of a rescue party for accidents that do not require an emergency response may be minimized.

At step 460, the proxy PSAP FE 170 may disconnect the call to the AECD.

At step 465, the AECD may terminate the procedure.

Figure 5:
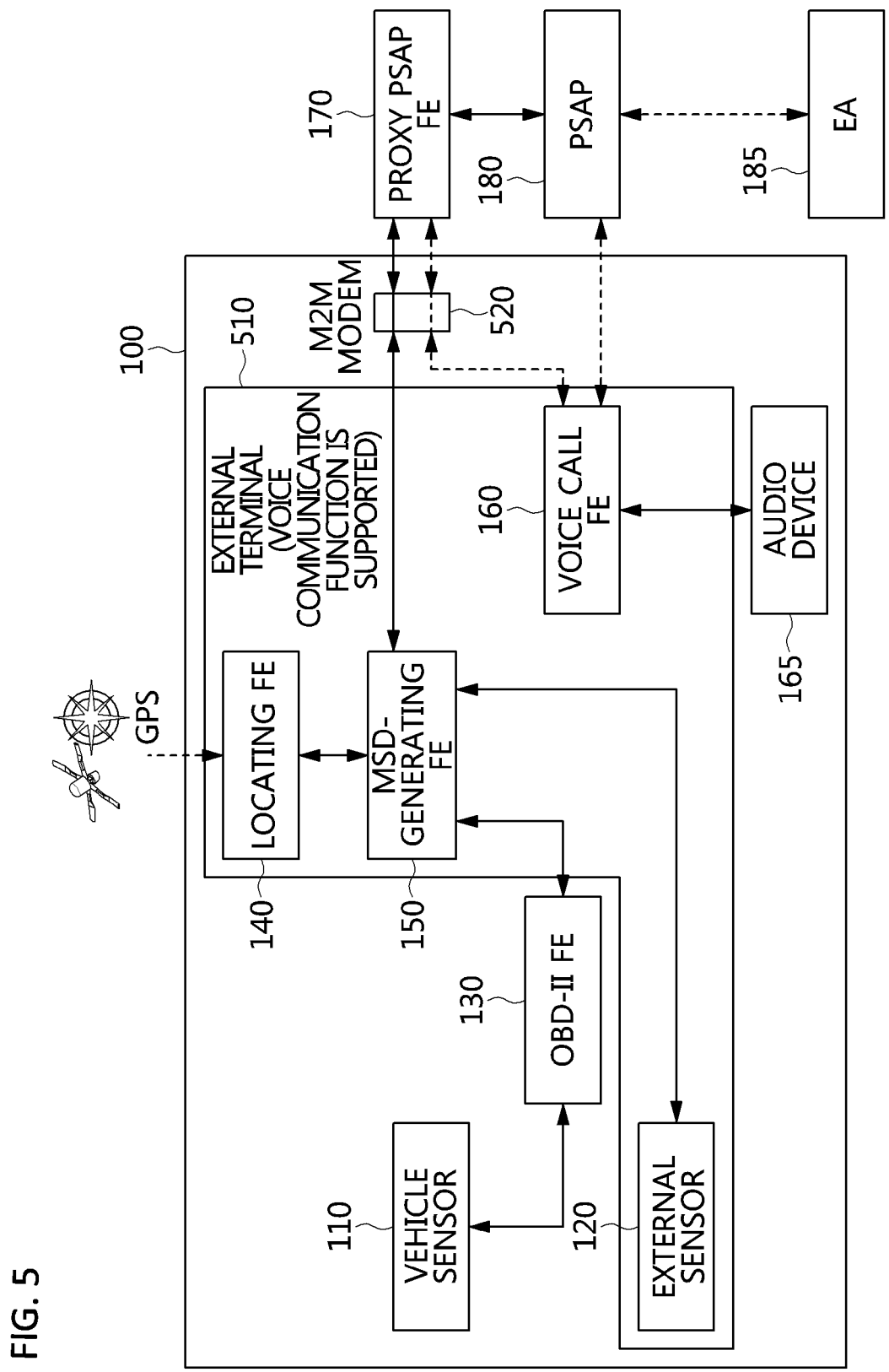
FIG. 5 is a configuration diagram of a vehicle emergency notification apparatus using an external black box or an external navigation device that uses a Machine-To-Machine (M2M) modem in which voice communication is supported according to an embodiment.

FIG. 5 is a configuration diagram of a vehicle emergency notification apparatus using an external black box or an external navigation device that uses a Machine-To-Machine (M2M) modem in which voice communication is supported according to an embodiment;

The vehicle emergency notification apparatus 100 may include an external terminal 510 and an M2M modem 520.

The external terminal 510 may be a black box, a navigation device, a phone or an ODB-II scanner. Each of the black box, the navigation device, the phone and the ODB-II scanner may be an external device attachable to or detachable from a vehicle.

As shown in FIG. 5, an external sensor 120, a locating FE 140, an MSD-generating FE 150, and a voice call FE 160 may be implemented as the external terminal 510. Alternatively, the external terminal 510 may include the above-described external sensor 120, locating FE 140, MSD-generating FE 150, and voice call FE 160. Alternatively, the operations and functions of the above-described external sensor 120, locating FE 140, MSD-generating FE 150 and voice call FE 160 may be performed by the external terminal 510.

The M2M modem 520 may be a modem for supporting voice communication, such as a Voice over Long-Term Evolution (VoLTE).

When an MSD is generated by the external terminal 510, communication with a proxy PSAP FE 170 may be performed by the M2M modem 520. The M2M modem 520 may transmit the MSD to the proxy PSAP FE 170.

Figure 6:
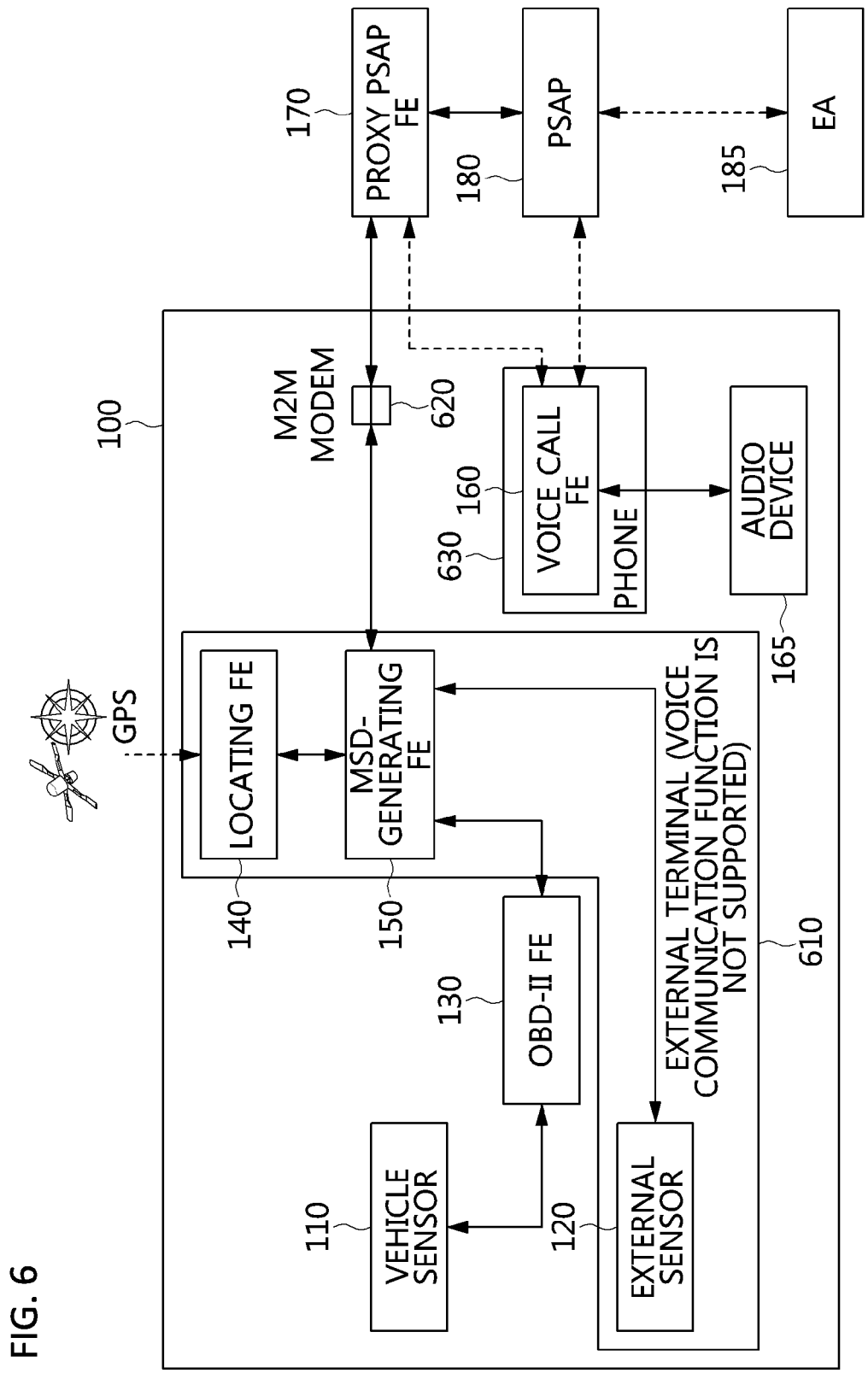
FIG. 6 is a configuration diagram of a vehicle emergency notification apparatus using an external black box or an external navigation device that uses an M2M modem in which voice communication is not supported according to an embodiment.

FIG. 6 is a configuration diagram of a vehicle emergency notification apparatus using an external black box or an external navigation device that uses an M2M modem in which voice communication is not supported according to an embodiment.

The vehicle emergency notification apparatus 100 may include an external terminal 610, an M2M modem 620, and a phone 630. The phone 630 may be a radiotelephone supporting voice communication.

The external terminal 610 may be a black box or a navigation device. Each of the black box and the navigation device may be an external device attachable to or detachable from a vehicle.

As shown in FIG. 6, an external sensor 120, a locating FE 140, and an MSD-generating FE 150 may be implemented as the external terminal 610. Alternatively, the external terminal 610 may include the above-described external sensor 120, locating FE 140, and MSD-generating FE 150. Alternatively, the operations and functions of the above-described external sensor 120, locating FE 140, and MSD-generating FE 150 may be performed by the external terminal 610.

When an MSD is generated by the external terminal 610, communication with a proxy PSAP FE 170 may be performed by the M2M modem 620. The M2M modem 520 may transmit the MSD to the proxy PSAP FE 170.

The M2M modem 620 may be a modem that does not support voice communication.

Since the M2M modem 620 does not support voice communication, the phone 630 may be separately required in order to make a voice call to the PSAP 180. As shown in FIG. 6, a voice call FE 160 may be implemented as the phone 630. Alternatively, the phone 630 may include the above-described voice call FE 160. Alternatively, the operations and functions of the above-described voice call FE 160 may be performed by the phone 630.

For interaction with the phone 630, the MSD-generating FE 150 may acquire information about the phone. The information about the phone may include a phone number.

Figure 7:
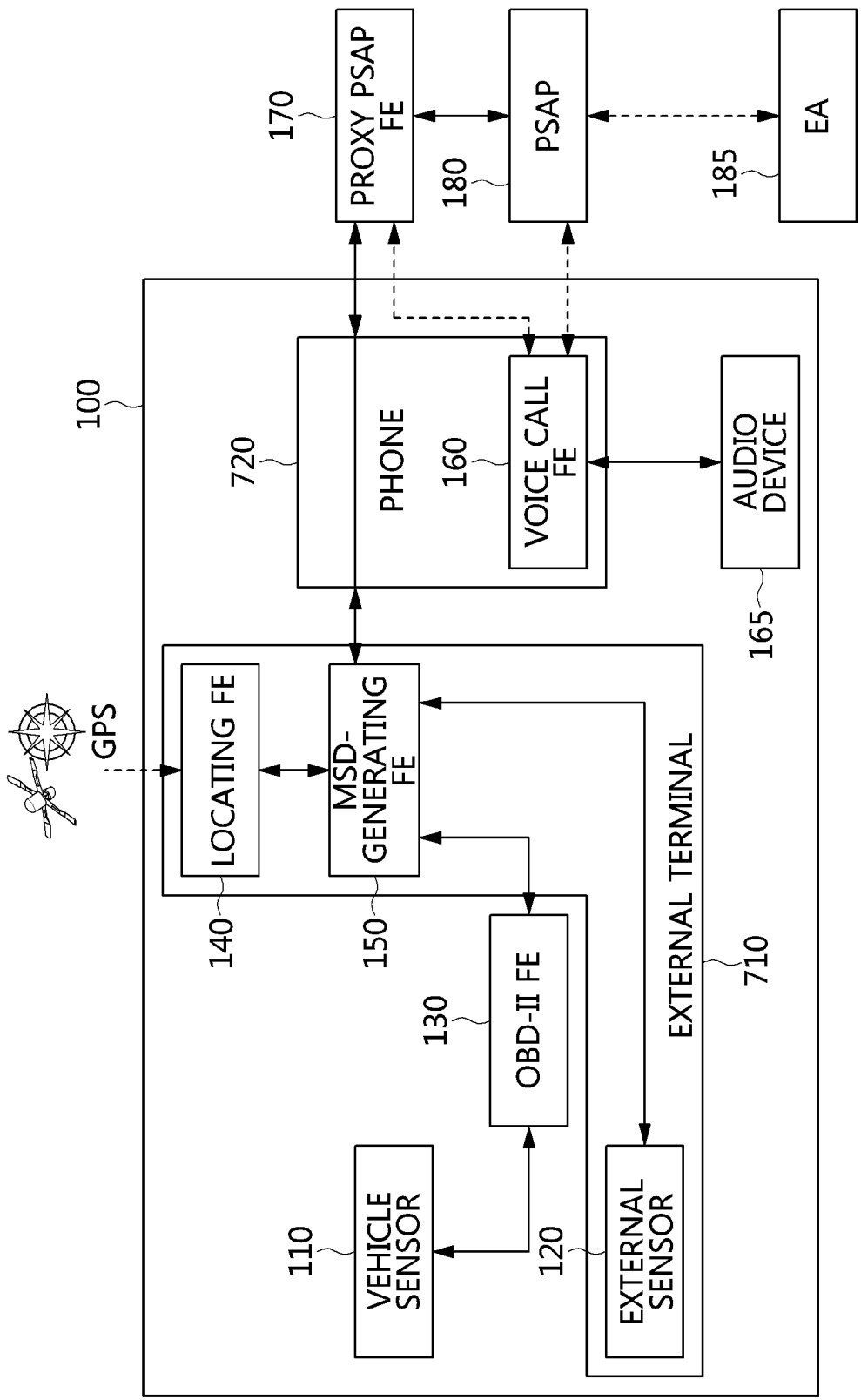
FIG. 7 is a configuration diagram of a vehicle emergency notification apparatus using an external black box or an external navigation device that uses a mobile phone tethering function according to an embodiment.

FIG. 7 is a configuration diagram of a vehicle emergency notification apparatus using an external black box or an external navigation device that uses a mobile phone tethering function according to an embodiment.

The vehicle emergency notification apparatus 100 may include an external terminal 710 and a phone 720. The phone 720 may be a radiotelephone supporting voice communication.

The external terminal 710 may be a black box or a navigation device. Each of the black box and the navigation device may be an external device attachable to or detachable from the vehicle.

As shown in FIG. 7, an external sensor 120, a locating FE 140, and an MSD-generating FE 150 may be implemented as the external terminal 710. Alternatively, the external terminal 710 may include the above-described external sensor 120, locating FE 140, and MSD-generating FE 150. Alternatively, the operations and functions of the above-described external sensor 120, locating FE 140, and MSD-generating FE 150 may be performed by the external terminal 710.

The external terminal 710 may communicate with the proxy PSAP FE 170 via the phone.

When an MSD is generated by the external terminal 710, communication with a proxy PSAP FE 170 may be conducted via mobile phone tethering provided by the phone 720. By means of the mobile phone tethering of the phone 720, the MSD may be transmitted to the proxy PSAP FE 170.

As shown in FIG. 7, a voice call FE 160 may be implemented as the phone 720. Alternatively, the phone 720 may include the above-described voice call FE 160. Alternatively, the operations and functions of the above-described voice call FE 160 may be performed by the phone 720.

For interaction with the phone 720, the MSD-generating FE 150 may acquire information about the phone. The information about the phone may include a phone number.

Figure 8:
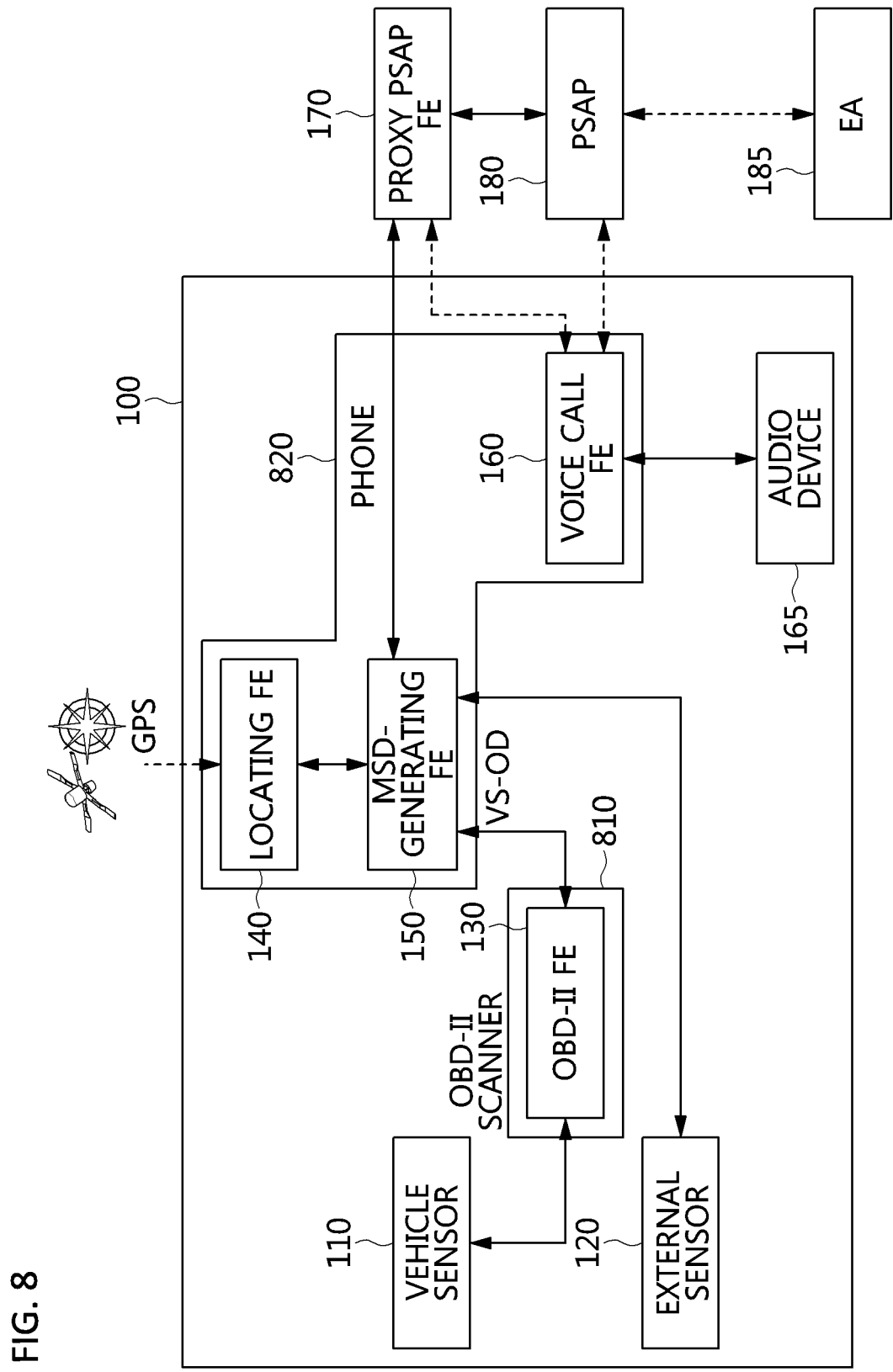
FIG. 8 is a configuration diagram of a vehicle emergency notification apparatus using an ODB-II scanner according to an embodiment.

FIG. 8 is a configuration diagram of a vehicle emergency notification apparatus using an ODB-II scanner according to an embodiment.

The vehicle emergency notification apparatus 100 may include an ODB-II scanner 810 and a phone 820. The phone 820 may be a radiotelephone supporting voice communication.

As shown in FIG. 8, an ODB-II FE 130 may be implemented as the ODB-II scanner 810. Alternatively, the ODB-II scanner 810 may include the above-described ODB-II FE 130. Alternatively, the operations and functions of the above-described ODB-II FE 130 may be performed by the ODB-II scanner 810.

Further, as shown in FIG. 8, a locating FE 140, an MSD-generating FE 150, and a voice call FE 160 may be implemented as the phone 820. Alternatively, the phone 820 may include the above-described locating FE 140, MSD-generating FE 150, and voice call FE 160. Alternatively, the operations and functions of the above-described locating FE 140, MSD-generating FE 150, and voice call FE 160 may be performed by the phone 820.

The phone 820 may transmit an MSD to the proxy PSAP FE 170.

Figure 9:
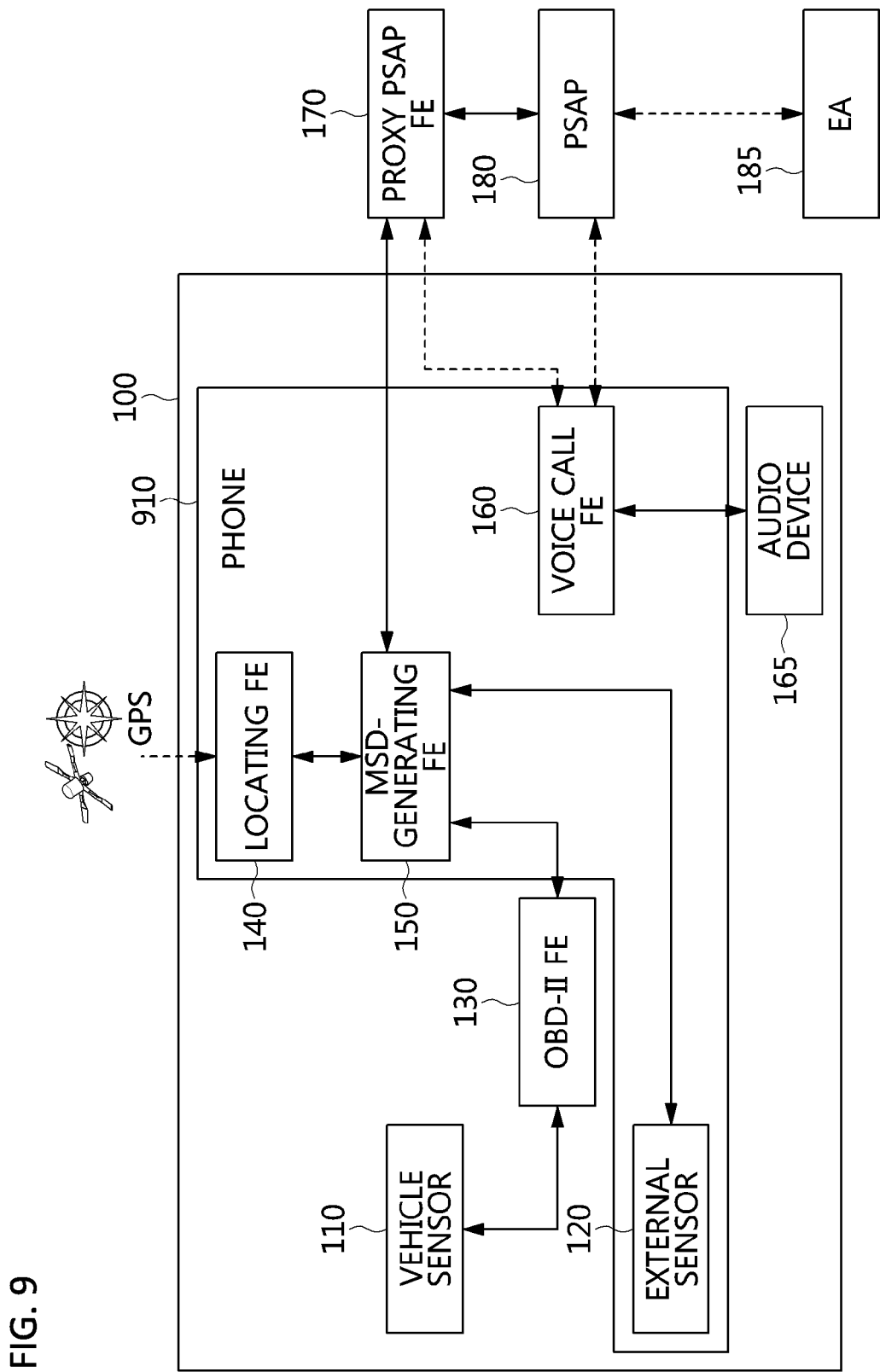
FIG. 9 is a configuration diagram of a vehicle emergency notification apparatus using a built-in sensor of a phone according to an embodiment.

FIG. 9 is a configuration diagram of a vehicle emergency notification apparatus using a built-in sensor of a phone according to an embodiment.

The vehicle emergency notification apparatus 100 may include a phone 910.

The phone 910 may be a radiotelephone supporting voice communication.

As shown in FIG. 9, an external sensor 120, a locating FE 140, an MSD-generating FE 150, and a voice call FE 160 may be implemented as the phone 910. Alternatively, the phone 910 may include the above-described external sensor 120, locating FE 140, MSD-generating FE 150, and voice call FE 160. Alternatively, the operations and functions of the above-described external sensor 120, locating FE 140, MSD-generating FE 150, and voice call FE 160 may be performed by the phone 910.

The external sensor 120 may correspond to the sensor of the phone 910.

The phone 910 may transmit an MSD to a proxy PSAP FE 170.

The aforementioned apparatus may be embodied as a hardware element, a software element, and/or a combination of a hardware element and a software element. For example, the system, apparatus and elements described in embodiments may be embodied using at least one general-purpose computer or special-purpose computer such as a processor, a controller, an arithmetic logic unit (ALU), a digital signal processor, a microcomputer, a field programmable array (FPA), a programmable logic unit (PLU), a microprocessor, or another apparatus for executing and responding to an instruction. The processor may execute an operating system (OS) and at least one software application that runs on the OS. Also, the processor may access, store, operate, process, and create data in response to the execution of software. For the convenience of understanding, a single processor may be used, however, those skilled in the art may appreciate that the processor may include a plurality of processing elements and/or a plurality of processing element types. For example, the processor may include a plurality of processors or a single processor and a single controller. Further, another processing configuration such as a parallel processor is possible.

The software may include at least one of a computer program, a code and an instruction solely or in combination, configure the processor to operate as desired, or instruct the processor to operate independently or collectively. The software and/or the data may be embodied permanently or temporarily in any type of machine, component, physical equipment, virtual equipment, computer storage medium or device, or transmitted signal wave, in order to be interpreted by the processor or to provide the processor with the instructions or the data. The software may be distributed on computer systems connected over a network, and may be stored or implemented in the distributed method. The software and the data may be stored in one or more computer-readable storage media.

The methods according to the above embodiments may be implemented as program instructions that can be executed by various computer means and may be recorded on a computer-readable storage medium. The computer-readable storage medium may include program instructions, data files, and data structures, either solely or in combination. Program instructions recorded on the storage medium may have been specially designed and configured for the embodiments of the present disclosure, or may be known to or available to those who have ordinary knowledge in the field of computer software. Examples of the computer-readable storage medium include all types of hardware devices specially configured to record and execute program instructions, such as magnetic media such as a hard disk, a floppy disk, and magnetic tape, optical media such as compact disk (CD)-read only memory (ROM) and a digital versatile disk (DVD), magneto-optical media such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present disclosure, and vice versa.

As described above, provided are an apparatus and method that provide notification of a vehicle emergency using an external terminal such as a black box or a navigation device which is additionally mounted in a vehicle after the vehicle is purchased.

Provided are an apparatus and method that provide an e-Call function using an external terminal.

Provided are an apparatus and method that enable an e-Call function to be provided even to an older model vehicle, to which an e-Call function was not provided by a vehicle manufacturer.

Provided are an apparatus and method that allow an occupant of a vehicle in which an accident has occurred to cancel the report of occurrence of the accident.

Provided are an apparatus and method that can investigate the report of occurrence of an accident before the operating personnel of a PSAP intervene in the response to the accident, and can exclude reports of occurrence of accidents that do not require an emergency response.

Provided are an apparatus and method that can minimize an operating load on a PSAP by canceling reports of occurrence of accidents or by excluding reports of occurrence of accidents.

Although the present disclosure has been shown and described with reference to limited embodiments and the accompanying drawings, it will be appreciated by those skilled in the art that various changes and modifications may be made from the above descriptions. For example, even if the aforementioned technologies are carried out in an order differing from the one described above and/or illustrated elements, such as systems, structures, devices and circuits, are combined or united in forms differing from those described above or are replaced or substituted with other elements or equivalents, the same results may be achieved.

What is claimed is:

1. A vehicle emergency notification apparatus, comprising:
   a proxy Safety Answering Point (SAP) for receiving a Minimum Set of Data (MSD) related to occurrence of an accident involving a vehicle from a terminal in the vehicle, and transferring the MSD to a SAP in a case that it is confirmed that the accident of the vehicle has occurred by the proxy SAP; and
   an interface for providing communication between the terminal in the vehicle and the proxy SAP, wherein
   the proxy SAP determines whether the accident involving the vehicle has occurred by making a voice call to an occupant of the vehicle before transferring the MSD to the SAP, and transfers the MSD to the SAP in a case that it is determined that the accident has occurred based on the voice call, and
   the proxy SAP connects the voice call, currently made to the occupant, to the SAP either after the MSD has been transferred to the SAP or while the MSD is being transferred thereto in a case that it is determined that the accident has occurred.

2. The vehicle emergency notification apparatus of claim 1, wherein the proxy SAP makes the voice call to the occupant using an automatic response function, and determines whether the accident has occurred based on a status of the voice call.

3. The vehicle emergency notification apparatus of claim 2, a function of a voice call that uses the automatic response function between the occupant and the proxy SAP is provided by the vehicle.

4. The vehicle emergency notification apparatus of claim 3, wherein the vehicle provides a function of a voice call between the occupant and the SAP.

5. The vehicle emergency notification apparatus of claim 1, wherein:
   if the occupant does not answer the voice call within a predetermined period of time, the proxy SAP determines that the accident has occurred.

6. The vehicle emergency notification apparatus of claim 5, wherein:
the proxy SAP makes the voice call to a mobile terminal of the occupant using call information,
the call information is information required in order to make the voice call to the occupant, and
the call information is included either in the MSD or in information that is transmitted together with the MSD to the proxy SAP.

7. The vehicle emergency notification apparatus of claim 1, wherein the proxy SAP is configured to, when a request to cancel a request for an emergency response is not received from the occupant via the voice call, transfer the MSD to the SAP.

8. The vehicle emergency notification apparatus of claim 1, wherein the proxy SAP is configured to, when a request to cancel a report of the accident is received from the terminal in the vehicle, determine not to transfer the MSD to the SAP.

9. The vehicle emergency notification apparatus of claim 8, wherein the request to cancel the report of the accident is input by the occupant via a user interface of the terminal in the vehicle.

10. The vehicle emergency notification apparatus of claim 9, wherein:
the terminal in the vehicle requests the occupant to confirm occurrence of the accident involving the vehicle via the user interface, and
the terminal in the vehicle assumes that the accident involving the vehicle has occurred if time-out occurs without confirmation of the occupant within a period of time.

11. The vehicle emergency notification apparatus of claim 1, wherein the MSD is transmitted to the proxy SAP immediately after being generated as the terminal in the vehicle detects the accident.

12. The vehicle emergency notification apparatus of claim 1, wherein the terminal in the vehicle is a detachable or replaceable device that is not built in the vehicle.

13. The vehicle emergency notification apparatus of claim 1, wherein the terminal in the vehicle is any one of a black box, a navigation device, and a phone.

14. The vehicle emergency notification apparatus of claim 1, wherein the terminal in the vehicle communicates with the proxy SAP via a radiotelephone that supports voice communication.

15. A vehicle emergency notification method, comprising:
receiving a Minimum Set of Data (MSD) related to occurrence of an accident involving a vehicle from the terminal in the vehicle; and
transferring the MSD to a Safety Answering Point (SAP) in a case that it is confirmed that the accident of the vehicle has occurred by the proxy SAP, wherein
whether the accident involving the vehicle has occurred is determined by making a voice call to an occupant of the vehicle before transferring the MSD to the SAP, and the MSD is transferred to the SAP in a case that it is determined that the accident has occurred based on the voice call, and
the voice call is connected, currently made to the occupant, to the SAP either after the MSD has been transferred to the SAP or while the MSD is being transferred thereto in a case that it is determined that the accident has occurred.

* * * * *